(12) United States Patent
Kim (10) Patent No.: US 9,746,155 B2
(45) Date of Patent: Aug. 29, 2017

(54) BACKLIGHT ASSEMBLY WITH A REFLECTIVE MEMBER COVERING INTERFACE BETWEEN SUBSTRATE UNITS

(71) Applicant: SAMSUNG DISPLAY CO., LTD., Yongin, Gyeonggi-do (KR)

(72) Inventor: Yong-Il Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 907 days.

(21) Appl. No.: 14/049,638

(22) Filed: Oct. 9, 2013

(65) Prior Publication Data

US 2014/0036479 A1 Feb. 6, 2014

Related U.S. Application Data

(63) Continuation of application No. 12/846,782, filed on Jul. 29, 2010, now Pat. No. 8,587,747.

(30) Foreign Application Priority Data

Sep. 10, 2009 (KR) .................. 10-2009-0085516

(51) Int. Cl.
*F21V 7/00* (2006.01)
*G02F 1/1335* (2006.01)

(52) U.S. Cl.
CPC ...... *F21V 7/0066* (2013.01); *G02F 1/133605* (2013.01); *G02F 1/133611* (2013.01)

(58) Field of Classification Search
None
See application file for complete search history.

(56) References Cited

U.S. PATENT DOCUMENTS

| | | |
|---|---|---|
| 7,510,291 B2 | 3/2009 | Song et al. |
| 7,530,711 B2 | 5/2009 | Bang |
| 7,658,504 B2 | 2/2010 | Moriyasu et al. |
| 7,713,092 B2 | 5/2010 | Kim et al. |
| 7,967,490 B2 | 6/2011 | Kim et al. |
| 2006/0104080 A1 | 5/2006 | Kim et al. |
| 2006/0187660 A1 | 8/2006 | Liu |
| 2006/0279671 A1 | 12/2006 | Han et al. |
| 2007/0153515 A1* | 7/2007 | Hong ............... G02F 1/133603 362/237 |
| 2008/0036940 A1 | 2/2008 | Song et al. |
| 2009/0002988 A1 | 1/2009 | Kim et al. |
| 2010/0008066 A1* | 1/2010 | Moro ............... G02F 1/133608 362/97.1 |
| 2010/0053505 A1 | 3/2010 | Yamazaki et al. |
| 2010/0328966 A1* | 12/2010 | Shin ............... G02F 1/133605 362/609 |

FOREIGN PATENT DOCUMENTS

| KR | 10-2006-0121442 | 11/2006 |
|---|---|---|
| KR | 10-2007-0070711 A | 7/2007 |

(Continued)

*Primary Examiner* — Dennis Y Kim
(74) *Attorney, Agent, or Firm* — Innovation Counsel LLP (57) ABSTRACT

A backlight assembly capable of reducing light loss is presented. The backlight assembly includes a plurality of substrate units and a plurality of reflective members on the substrate units arranged to form an adjacent area where two reflective members are closest to each other. The adjacent area is on one of the substrate units. A display device incorporating the backlight assembly is also presented.

7 Claims, 9 Drawing Sheets

(56) References Cited

FOREIGN PATENT DOCUMENTS

| KR | 10-2008-0062827 A | 7/2008 |
|----|-------------------|--------|
| KR | 10-2008-0113901 A | 12/2008 |
| KR | 10-0875703        | 12/2008 |
| KR | 10-0896093        | 4/2009 |
| KR | 10-0908030        | 7/2009 |
| WO | 2008/115360 A1    | 9/2008 |

\* cited by examiner

BACKLIGHT ASSEMBLY WITH A REFLECTIVE MEMBER COVERING INTERFACE BETWEEN SUBSTRATE UNITS

CROSS-REFERENCE TO RELATED APPLICATION

This application is a continuation application of U.S. patent application Ser. No. 12/846,782 filed on Jul. 29, 2010, which claims priority to Korean Patent Application No. 10-2009-0085516 filed on Sep. 10, 2009; where the disclosures of both said applications are incorporated herein by reference in their entirety.

FIELD OF INVENTION

The present invention refers generally to a backlight assembly for a display device.

BACKGROUND

Liquid crystal display (LCD) devices are commonly used today as monitors for televisions, computers, laptops, mobile phones, and personal digital assistants (PDAs), among other devices. Typically, liquid crystal display devices include a display panel and a backlight assembly. The backlight assembly provides light to the display panel, and the display panel includes a layer of liquid crystal molecules sandwiched between transparent substrates to modulate light transmission, thereby displaying the desired images.

There are a few different types of backlight assemblies, such as an edge-type backlight assembly where the light sources are positioned along one or more edges of a light guide plate, and a direct-type backlight assembly where the light sources are underneath the display panel. Typically, a backlight assembly includes a substrate unit to which light sources are coupled and a reflective member positioned on the substrate unit to redirect stray light toward the display panel.

Even with the reflective member, some light is still lost (i.e., not directed toward the display panel to enhance image brightness). A way of further reducing light loss is desired.

SUMMARY

In one aspect, the invention is a backlight assembly that includes a plurality of substrate units and a plurality of reflective members disposed on the substrate units, wherein at least one of the reflective members is larger than one of the substrate units and at least one of the reflective members is smaller than or the same size as one of the substrate units.

In another aspect, the invention is a backlight assembly that includes a plurality of substrate units and a plurality of reflective members on the substrate units arranged to form an adjacent area where two reflective members are closest to each other, wherein the adjacent area is on one of the substrate units.

In yet another aspect, the invention is a backlight assembly that includes a plurality of substrate units arranged next to one another and a reflective member arranged on the substrate units such that an edge of one of the substrate units and an edge of the reflective member covering the substrate unit are at non-overlapping locations.

In yet another aspect, the invention is a display device that includes a panel that display images and a backlight assembly coupled to the panel and providing light to the panel. The backlight assembly includes a plurality of substrate units and a plurality of reflective members on the substrate units arranged to form an adjacent area where two neighboring reflective members are closest to each other, wherein the adjacent area is on one of the substrate units.

BRIEF DESCRIPTION OF THE DRAWINGS

FIG. 5b is a cross sectional view of the substrate units and reflective members of the embodiment shown in FIG. 5a.

DETAILED DESCRIPTION

Figure 1:
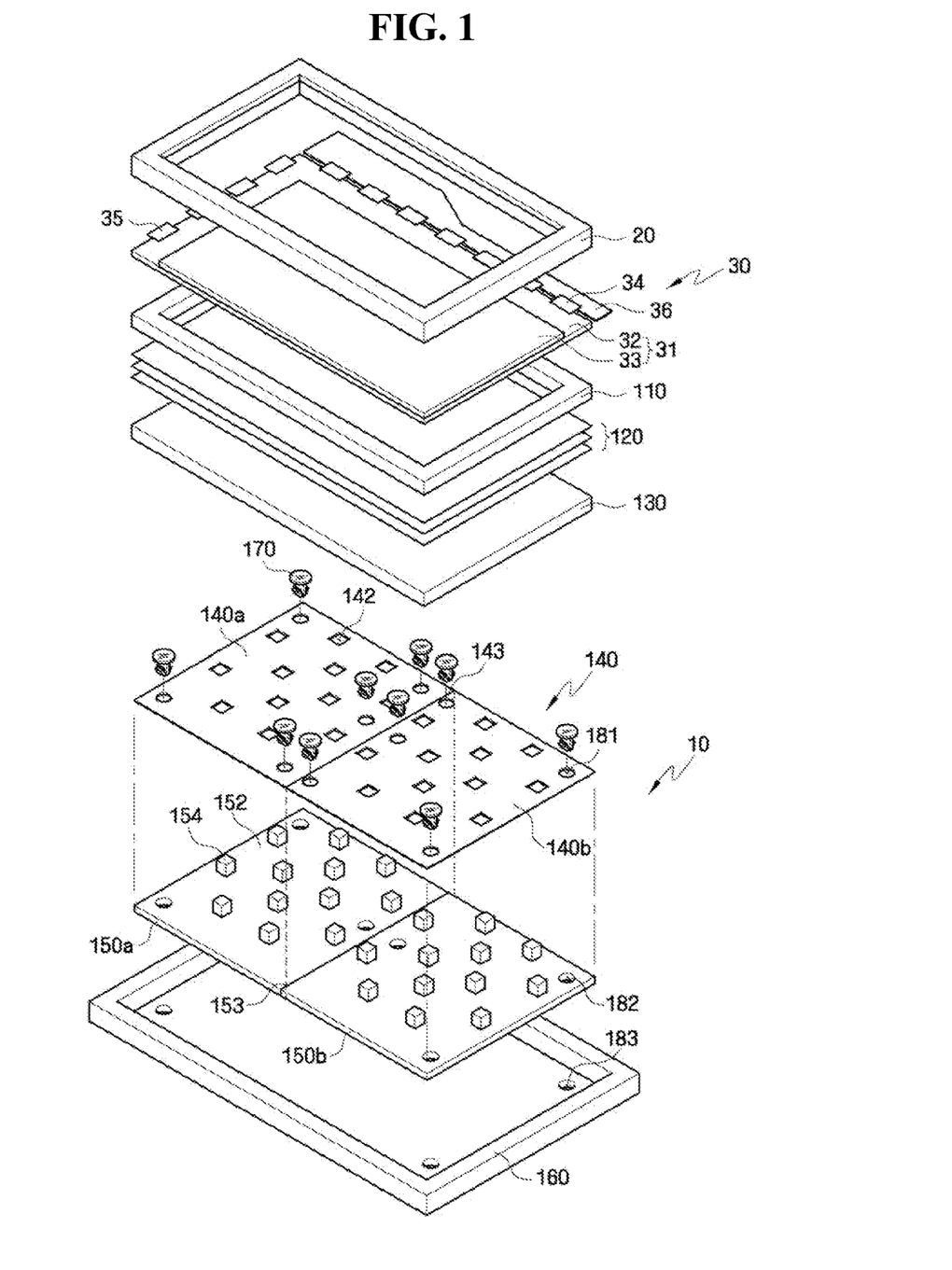
FIG. 1 is an exploded perspective view of a display of the invention.

FIG. 1 is an exploded perspective view of a display device 100 of the invention. As shown, the display device 100 includes a display panel assembly 30, an upper receiving container 20, and a backlight assembly 10. The display panel assembly 30 includes a liquid crystal display panel 31, a printed circuit board 36 and flexible films 34, 35 connecting the printed circuit board 36 to the liquid crystal display panel 31. The liquid crystal display panel 31 may include an upper substrate 33, a lower substrate 32, and a liquid crystal layer disposed between the two substrates 32, 33. The printed circuit board 36 may include a plurality of chips generating signals for driving the liquid crystal panel 31, and the flexible films 34, 35 may transfer the signals to the liquid crystal panel 31.

The backlight assembly 10 includes a middle frame 110, optical sheets 120, an optical plate 130, reflective members 140a, 140b, substrate units 150a, 150b and a lower receiving container 160.

The substrate units 150a, 150b includes a substrate 152 and a plurality of point light sources 154 disposed on the substrate 152. A circuit may be formed on the substrate 152. The point light sources 154 may be mounted on the substrate 152 and connected to the circuit. The shape of the substrate 152 comprises a rectangular frame shape. The upper surface of the substrate units 150a, 150b may include a reflective material. For example, the upper surface of the light surface blocks 150a, 150b can be coated by a reflective material. The point light sources 154 comprise light emitting diodes (LEDs). The point light sources 154 may be disposed on the substrate 152 in various arrangements to improve luminance uniformity of the backlight assembly 10. For example, the point light sources 154 may be disposed uniformly on the substrate 152 in a matrix or a zigzag configuration.

The substrate units 150a, 150b are disposed adjacent to each other. A neighboring area 153 between the substrate units 150a, 150b may include a gap, as it is difficult to assemble the substrate units 150a, 150b without a gap in a real mass-production line.

The reflective members 140a, 140b are disposed on the substrate units 150a, 150b. The reflective members 140a, 140b reflect the light generated by the point light sources 154 that propagates away from the display panel assembly 30. The number of the reflective members 140a, 140b may be the same as the number of the substrate units 150a, 150b. Each of the reflective members 140a, 140b includes a plurality of openings 142 corresponding to the point light sources 154 to expose the point light sources 154. Each of the substrate units 150a, 150b further includes a coupling hole 181 to be coupled to the coupling member 170. The reflective members 140a, 140b are coupled to the substrate units 150a, 150b.

Adhesive materials may be disposed between the reflective members 140a, 140b and the substrate units 150a, 150b to keep the parts in place.

The substrate units 150a, 150b and the reflective members 140a, 140b are coupled to the lower receiving container 160 by the coupling member 170. The coupling member 170 may be formed of a reflective material, such as polycarbonate, although this is not a limitation of the invention. Polycarbonate has good reflectivity, heat-resistance and intensity. The coupling member 170 may include a screw or an adhesive tape.

The backlight assembly 10 may further include a heat spreader (not shown) disposed between the substrate units 150a, 150b and the lower receiving container 160. The heat spreader may include a coupling mechanism formed on an area of the heat spreader corresponding to the coupling holes 181, 182, 183.

The diffuser plate 130 is disposed over the reflective members 140a, 140b and diffuses the light generated by the substrate units 150a, 150b.

The optical sheets 120 are disposed over the diffuser plate 130 and diffuse and collimate the light supplied by the diffuser plate 130. The optical sheets 120 may include a diffuser sheet and a prism sheet.

The middle frame 110 is disposed over the diffuser plate 130 and coupled to the lower receiving container 160 to receive the diffuser plate 130, the optical sheets 120, the reflective members 140a, 140b and the substrate units 150a, 150b. The display panel assembly 30 is disposed on the middle frame 110.

The lower receiving container 160 includes a base plate and a plurality of sidewalls extending from the base plate to receive the diffuser plate 130, the optical sheets 120, the reflective members 140a, 140b and the substrate units 150a, 150b. The coupling hole 183 is formed on the base plate.

The upper receiving container 20 covers the edges of the display panel assembly 30 and is coupled to the lower receiving container 160.

Figure 2:
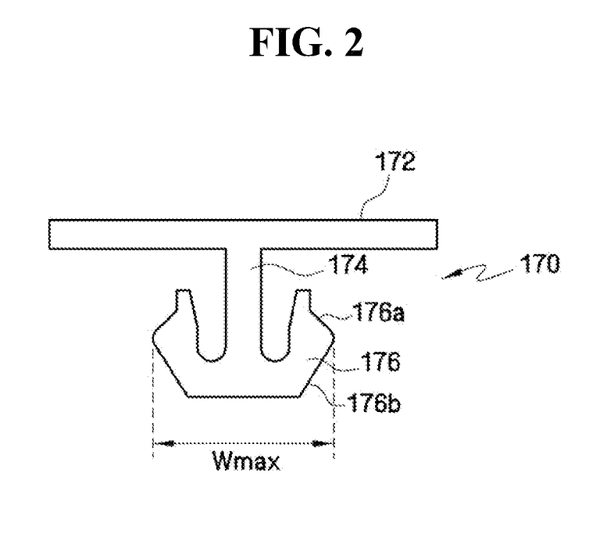
FIG. 2 is a cross sectional view showing the coupling member of the display device shown in FIG. 1.
Figure 3:
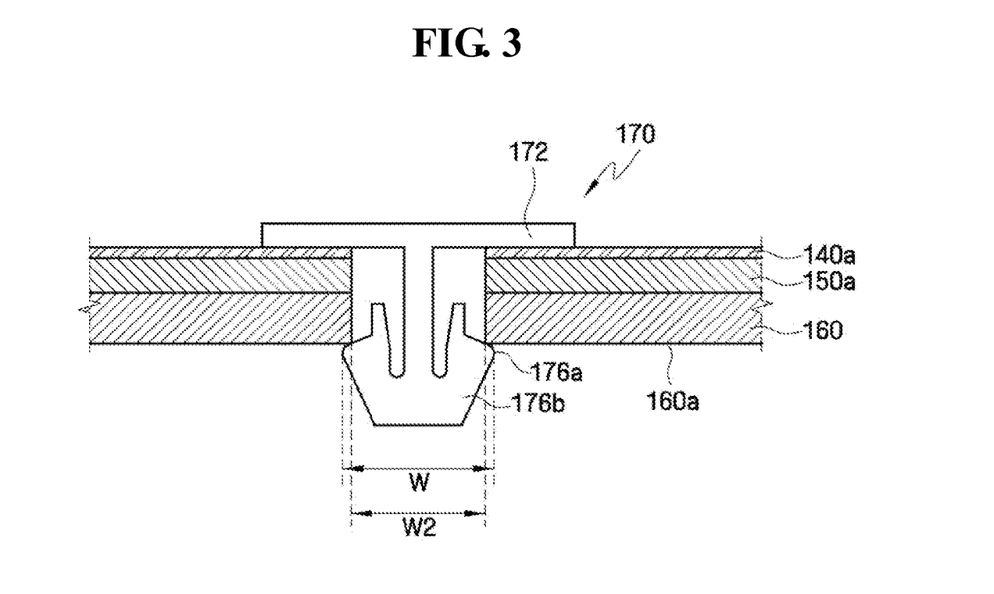
FIG. 3 is a cross sectional view showing the coupling member extending through the coupling holes of the display device shown in FIG. 1.

FIG. 2 is a cross sectional view showing the coupling member 170 of the display device shown in FIG. 1. FIG. 3 is a cross sectional view showing the coupling member 170 extending through the coupling holes of the display device shown in FIG. 1.

Referring to FIGS. 2 and 3, the coupling member 170 includes a head portion 172, a pillar portion 174 protruding from the head portion 172, and a hook portion 176 extending from the pillar portion 174. The outer surface of the hook portion 176 includes an upper inclined surface 176a and a lower inclined surface 176b. The shape of the head portion 172 may be a circle (when viewed from the top). The width of the pillar portion 174 is smaller than the diameter of the head portion 172. Coupling holes 181, 182, 183 are formed on the reflective members 140a, 140b, the substrate units 150a, 150b and the lower receiving container 160. The diameter W2 of the coupling holes 181, 182, 183 are smaller than the maximum width Wmax of the hook portion 176. The width W of the hook portion 176 gets smaller when the hook portion 176 passes through the coupling holes 181, 182, 183 and bends toward the pillar portion 174. The coupling holes 181 may be formed on areas close to the edges of the reflective members 140a, 140b. Coupling holes 182 may be formed on areas between the point light sources 154. The coupling holes 181, 182, and 183 are aligned so that the coupling member 170 can extend through all three layers of holes to fix the parts together.

Figure 4:
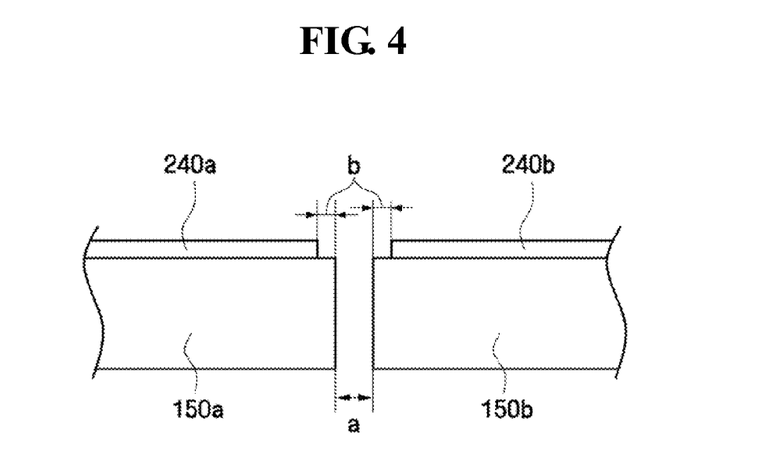
FIG. 4 is a cross sectional view of the substrate units and conventional reflective members in a conventional display device.

FIG. 4 is a cross sectional view of the substrate units 150a, 150b and conventional reflective members 240a, 240b in a conventional display device. As shown, the size of the reflective members 240a, 240b and the size of the substrate units 150a, 150b corresponding to the reflective members 240a, 240b are substantially the same. The neighboring area 153 of the substrate units 150a, 150b is not covered by the reflective members 240a, 240b. As a result, most of the light that falls into the gap between the conventional reflective members 240a, 240b end up propagating into the neighboring area 153 that includes a gap between the substrate units 150a, 150b. This localized loss of light causes a dark area in the image that is displayed.

The gap (a) may be larger than 0.3 mm. As can be seen, the gap between the light reflective members 240a, 240b (i.e., the gap in the adjacent area) is larger than 0.3 mm. During the assembly process of the backlight assembly, another gap may form between an end of the substrate unit 150a/150b and an end of the reflective member 240a/240b that covers the substrate unit 150a/150b. The gap (b) between an end of the substrate unit 150a/150b and an end of the reflective member 240a/240b can be controlled more precisely than the gap (a) between the substrate units 150a, 150b. For example, the gap (b) may be larger than 0.2 mm. Since the gap (a) between the substrate units 240a, 240b may be 0.4 mm or longer, so the gap between the reflective members 240a and 240b may be larger than 0.7 mm (0.3 mm+2(0.2 mm)).

In the conventional backlight assembly of FIG. 4, one of the ways light is lost is by falling into the gap between reflective sheets 240a, 240b. As the gap between the substrates 150a, 150b overlaps the gap between the reflective sheets 240a, 240b, the combined depth of the gaps is deep. Furthermore, there is no reflective material at the bottom of the gap between the substrates 150a, 150b, making it unlikely that the light that goes into this deep gap will be recovered. The deep gap resulting from the combination of the gap at the reflective layer and the gap at the substrate unit layer is responsible for significant light loss.

Covering the gap between the substrate units 150a, 150b with a reflective member that is large enough to cover multiple substrate units has been contemplated. However, this is likely to be an impractical solution because the large size of the reflective member would make it difficult to attach the reflective member to a plurality of substrate units without forming wrinkles. Furthermore, one of the factors that affect the price of the reflective member is its size. So, use of large reflector in a backlight assembly translates to an increase in the manufacturing cost. Moreover, when one of the substrate units stops to function properly and needs replacing, the reflective member has to be removed to change the substrate unit to a new one. Through the removal and reattachment process, the reflective member can become easily become damaged.

The invention offers a way to eliminate or reduce light loss to the deep gap that is approximately as deep as the combined thicknesses of the substrate layer and the reflective layer without the disadvantages associated with using a large reflective member. For example, the invention includes a backlight assembly that uses a plurality of light reflective members 140a, 140b to reduce light loss. The sizes of the reflective members may vary so that the gaps in the reflective layers do not align with the gaps in the substrate layer. This way, light that enters the gap in the reflective layer will only travel a short way down before being reflected back out by the reflective coating on the substrate surface. By avoiding the use of a large reflective member, high manufacturing cost and complicated substrate replacement/repair process can be avoided.

Figure 5A:
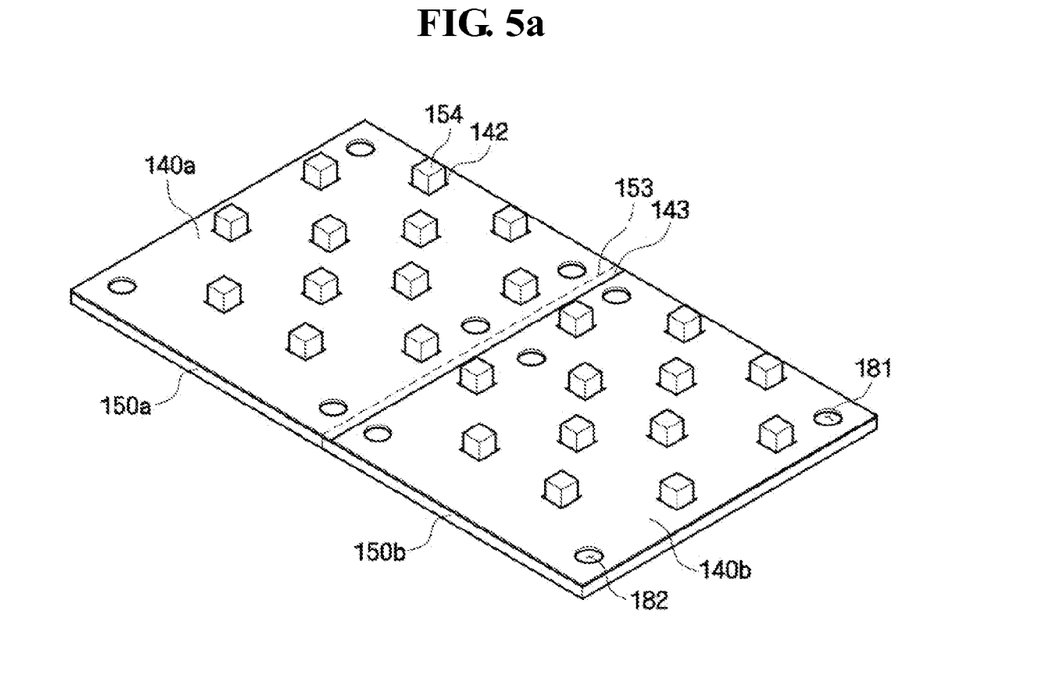
FIG. 5a is a perspective view of the substrate units and the reflective members in accordance with the invention.

FIG. 5a is a perspective view of the substrate units 150a, 150b and the reflective members 140a, 140b of the invention. In this embodiment, the reflective members 140a, 140b are of different sizes. The reflective members 140a, 140b are disposed close to each other, forming an adjacent area 143. In this embodiment, a first reflective member 140a covers the neighboring area 153 of the substrate units 150a, 150b. The first reflective member 140a is larger than a first substrate unit 150a that it covers, and a second reflective member 140b is smaller than a second substrate unit 150b that is covered by the second reflective member 140b. The reflective members 140a, 140b do not overlap each other, making the upper surface of the reflective members 140a, 140b substantially flat. The adjacent area 143 of the reflective members 140a, 140b is disposed on one of the substrates units, so the adjacent area 143 of the reflective members 140a, 140b does not align or overlap with the neighboring area 153 of the substrate units 150a, 150b.

The adjacent area 143 of the reflective member 140a, 140b may include a gap. The reflective members 140a, 140b comprise a reflective sheet or film, so the reflective members 140a, 140b are thinner and more flexible than the substrate units 150a, 150b. The gap in the adjacent area 143 of the reflective members 140a, 140b can be controlled more precisely than the gap in the neighboring area 153 of the substrate units 150a, 150b during the assembly process because of the characteristic of the reflective members 140a, 140b.

Figure 5B:
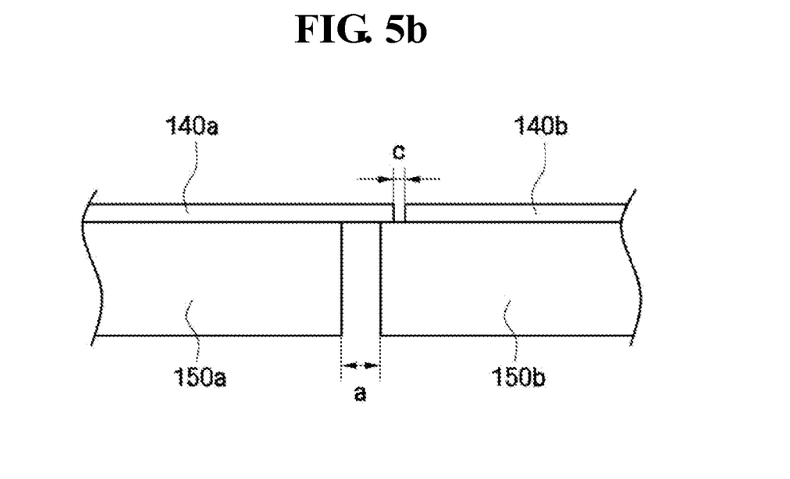

FIG. 5b is a cross sectional view of the substrate units 150a, 150b and reflective members 140a, 140b of the embodiment shown in FIG. 5a. As shown, one of the reflective members 140a, 140b covers the neighboring area 153 between the substrate units 150a, 150b. The adjacent area 143 between the light reflective members 140a, 140b may include a gap (c). The gap (c) may be reduced to about 0.2 mm. So the gap (c) between the reflective members 140a, 140b according to the present embodiment is narrower than the gap between the reflective members 240a, 240b of the conventional display device shown on FIG. 4.

The gap (c) between the reflective members 240a, 240b is disposed on a single substrate 152. As described above, the upper surface of the substrate 152 may include a reflective material, so the upper surface of the substrate 152 reflects any light that propagates into the gap (c). Also, the reflective members 140a, 140b may be thinner than the substrates 152, making the gap (c) shallower than the gap (b). With the reduced width and depth of gap (c) relative to the gap (a+2b) in the conventional device, the effect of a dark area caused by the gap between the reflective members is reduced.

Figure 6A:
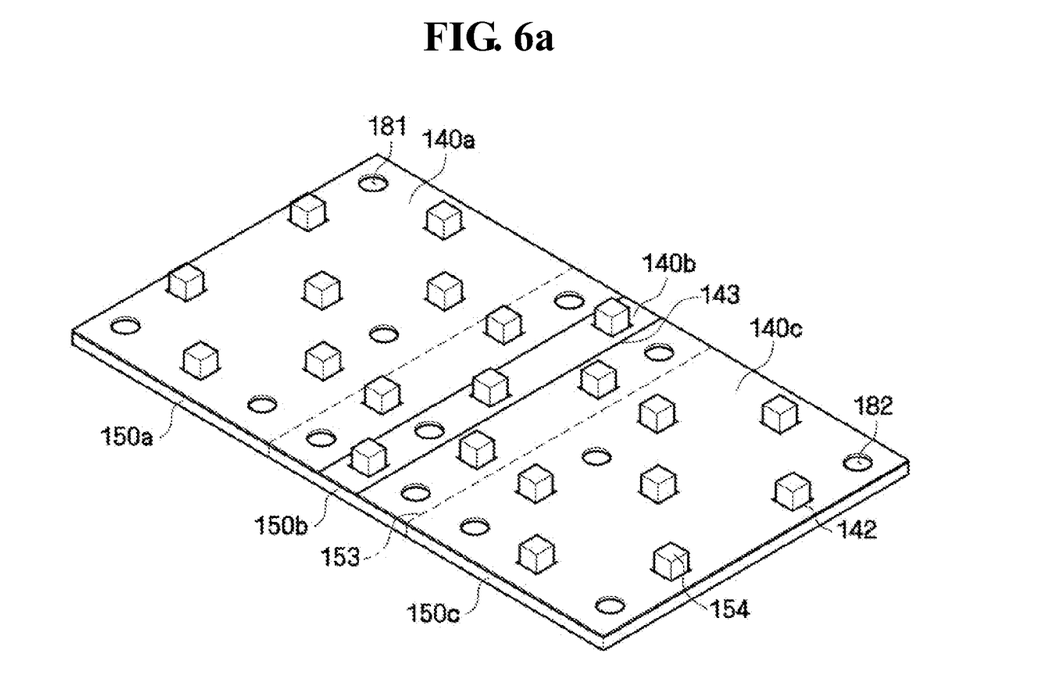
FIGS. 6a and 6b are perspective views showing substrate units and reflective members coupled to the substrate units in accordance with another embodiment of the present invention.
Figure 6B:
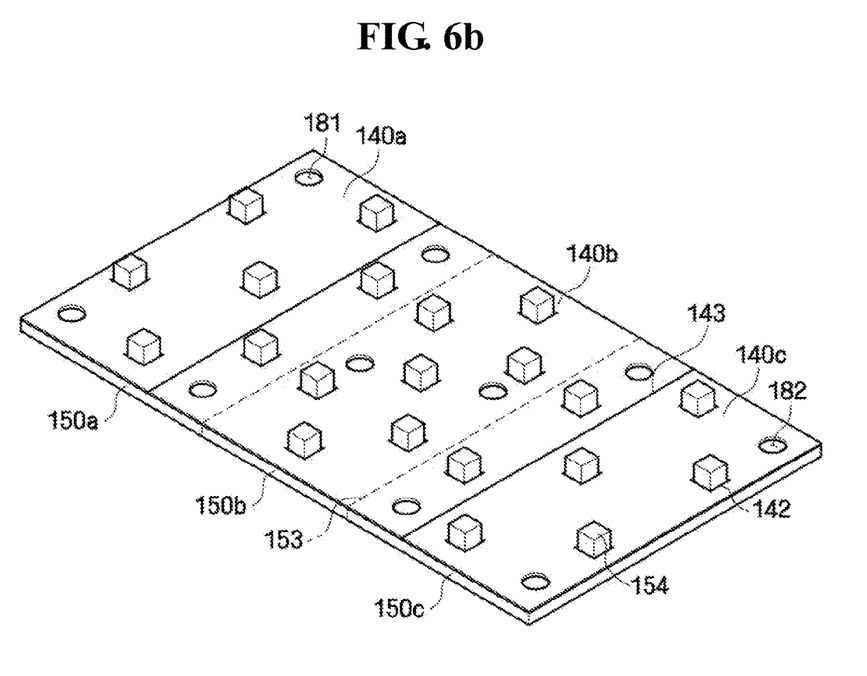

FIGS. 6a and 6b are perspective views showing substrate units 150a, 150b, 150c and reflective members 140a, 140b, 140c coupled to the substrate units 150a, 150b, 150c in accordance with another embodiment of the present invention. The display device shown in FIGS. 6a and 6b includes three substrate units 150a, 150b, 150c. Three reflective members 140a, 140b, 140c are disposed on the substrate units 150a, 150b, 150c.

In the embodiment of FIG. 6a, the reflective members 140a, 140b, 140c include first reflective members 140a, 140c larger than and covering the substrate units 150a, 150c and a second reflective member 140b smaller than and covering a portion of the substrate unit 150b. The first reflective members 140a, 140c cover the neighboring areas 153 at the interfaces between substrate units 150a, 150b, 150c.

In the embodiment of FIG. 6b, the second reflective member 140b is larger than the substrate unit 150b that it covers and disposed between the first reflective members 140a, 140c smaller than the substrate units 150a, 150c corresponding to the first reflective members 140a, 140c. The second reflective member 140b covers the neighboring areas 153 at the interfaces between the substrate units 150a, 150b, 150c.

The reflective members 140a, 140b, 140c do not overlap each other and the adjacent areas 143 at the interfaces of the reflective members 140a, 140b, 140c do not overlap with the neighboring areas 153 of the substrate units 150a, 150b, 150c. The adjacent areas 143 and the neighboring areas 153 are at different locations in plan view.

Figure 7:
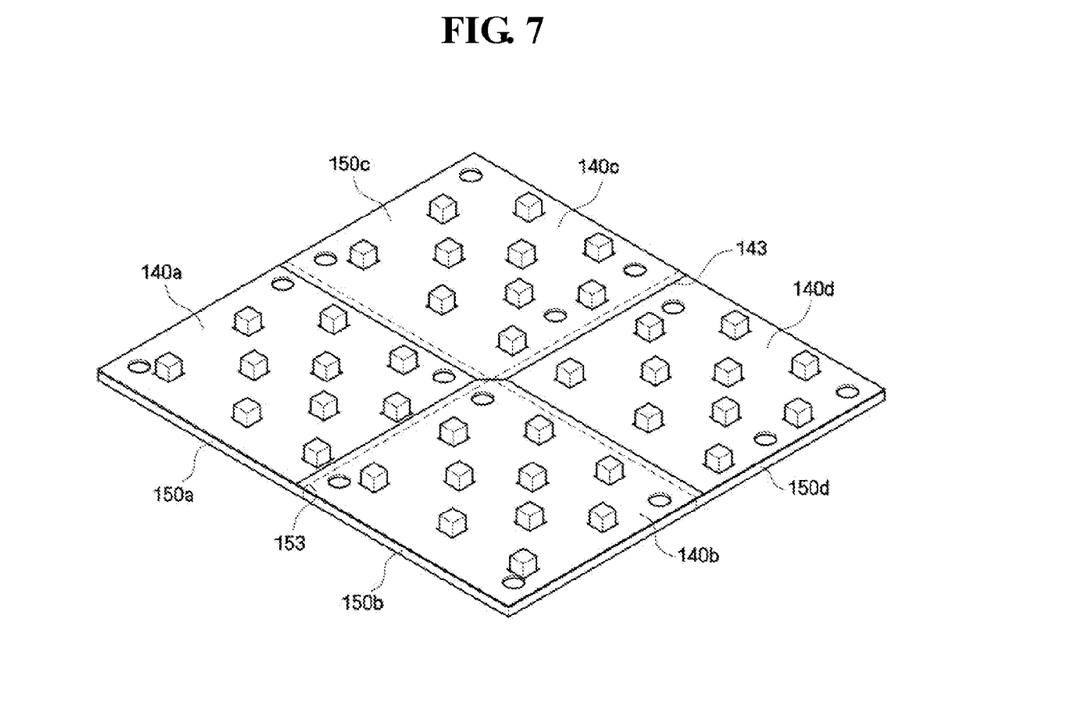
FIG. 7 is a perspective view showing substrate units 150a, 150b, 150c, 150d and reflective members 140a, 140b, 140c, 140d in accordance with yet another embodiment of the invention.

FIG. 7 is a perspective view showing substrate units 150a, 150b, 150c, 150d and reflective members 140a, 140b, 140c, 140d in accordance with yet another embodiment of the invention. As shown, the display device includes four substrate units 150a, 150b, 150c, 150d forming four neighboring areas 153. Four reflective members 140a, 140b, 140c, 140d are disposed on the substrate units 150a, 150b, 150c, 150d. The reflective members 140a, 140b, 140c, 140d include first reflective members 140b, 140c larger than the substrate units 150b, 150c and corresponding to the first reflective members 140b, 140c and second reflective members 140a, 140d smaller than the substrate units 150a, 150d and corresponding to the second reflective members 150a, 150c. The bigger first reflective members 140b, 140c cover the boundaries 153.

The substrate units 150a, 150b, 150c, 150d have rectangular shapes. The first reflective members 140b, 140c have irregular pentagonal shapes that look like rectangles with a corner cut off. The second reflective members 140*a*, 140*d* have rectangular shapes. The first and second reflective members 140*a*, 140*b*, 140*c*, 140*d* do not overlap. The adjacent areas 143 of the reflective members 140*a*, 140*b*, 140*c*, 140*d* do not overlap or align with the neighboring areas 153 of the substrate units 150*a*, 150*b*, 150*c*, 150*d*.

Figure 8:
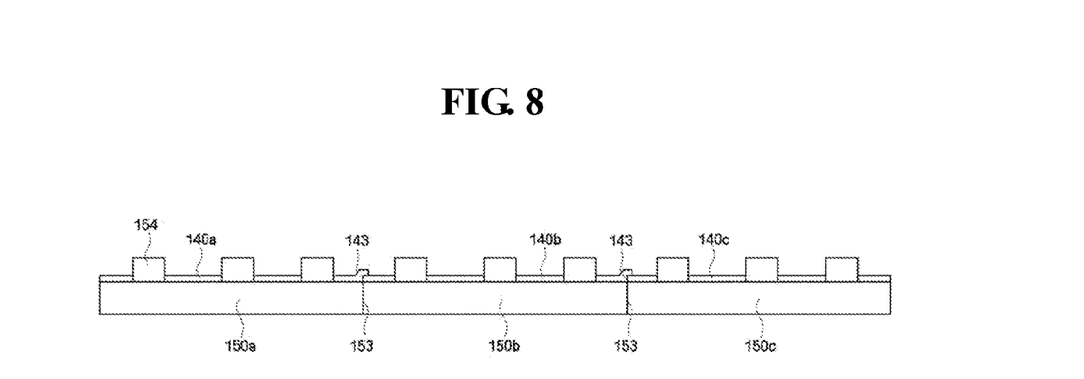
FIG. 8 is a cross sectional view showing substrate units and reflective members in accordance with yet another embodiment of the invention.

FIG. 8 is a cross sectional view showing substrate units 150*a*, 150*b*, 150*c* and reflective members 140*a*, 140*b*, 140*c* in accordance with yet another embodiment of the invention. As shown, the reflective members 140*a*, 140*b*, 140*c* overlap each other in the adjacent areas 143 where the reflective members 140*a*, 140*b*, 140*c* meet. The reflective members 140*a*, 140*b*, 140*c* cover the neighboring areas 153 of the substrate units 150*a*, 150*b*, 150*c*. In the example shown, the reflective member 140*c* is smaller than the reflective members 140*a* and 140*b*, which are of substantially the same size.

Figure 9:
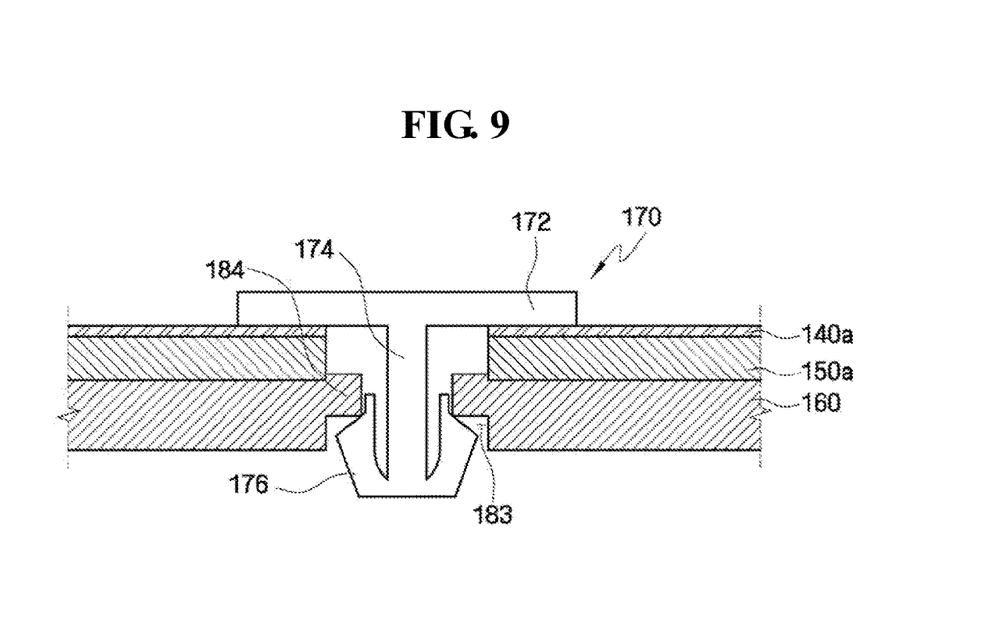
FIG. 9 is a cross sectional view showing coupling holes formed on a reflective member, a substrate unit, and a lower receiving container, and a coupling member coupled to the coupling holes in accordance with another embodiment of the invention.

FIG. 9 is a cross sectional view showing coupling holes formed on a reflective member 140*a*, a substrate unit 150*a* and a lower receiving container 160, and a coupling member coupled to the coupling holes in accordance with another embodiment of the invention. As shown, the lower receiving container 160 includes a coupling hole 183. A protruding portion 184 protruding from an inner surface of the coupling hole 183 contacts the hook portion 176 of the coupling member 170. According to the present embodiment, the hook portion 176 of the coupling member 170 is bent toward the pillar portion 174 when compressed by the coupling hole 183.

Figure 10:
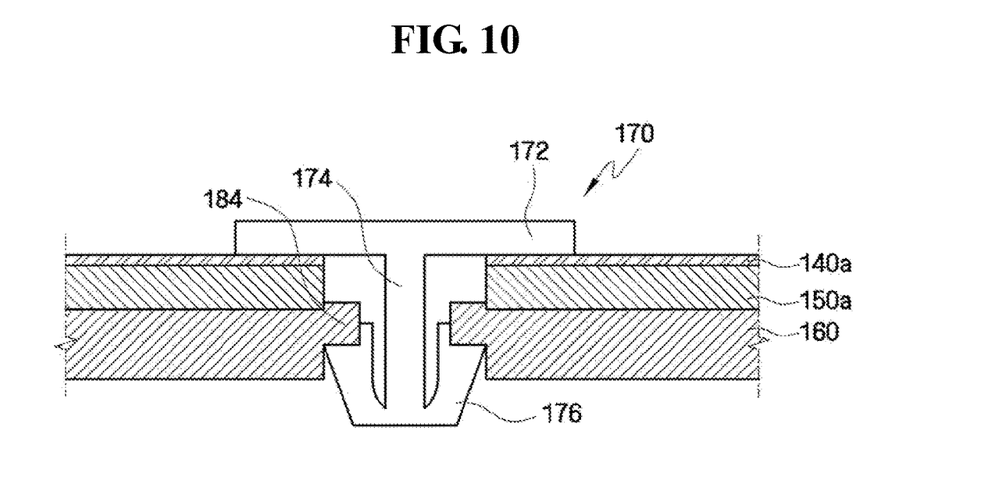
FIG. 10 is a cross sectional view showing coupling holes formed on a reflective member, a substrate unit, and a lower receiving container, and a coupling member coupled to the coupling holes in accordance with an embodiment of the invention.

FIG. 10 is a cross sectional view showing coupling holes formed on a reflective member 140*a*, a substrate unit 150*a* and a lower receiving container 160, and a coupling member coupled to the coupling holes in accordance with an embodiment of the invention. As shown, the hook portion 176 of the coupling member 170 includes at least one flat surface that contacts the bottom surface of the protruding portion 184. Due to the increased contact area between the lower receiving container 160 and the hook portion 176, the coupling member 170 is coupled the coupling hole 184 more securely. The head portion 172 covers the adjacent area 143 and the neighboring area 153 to prevent light loss.

Figure 11A:
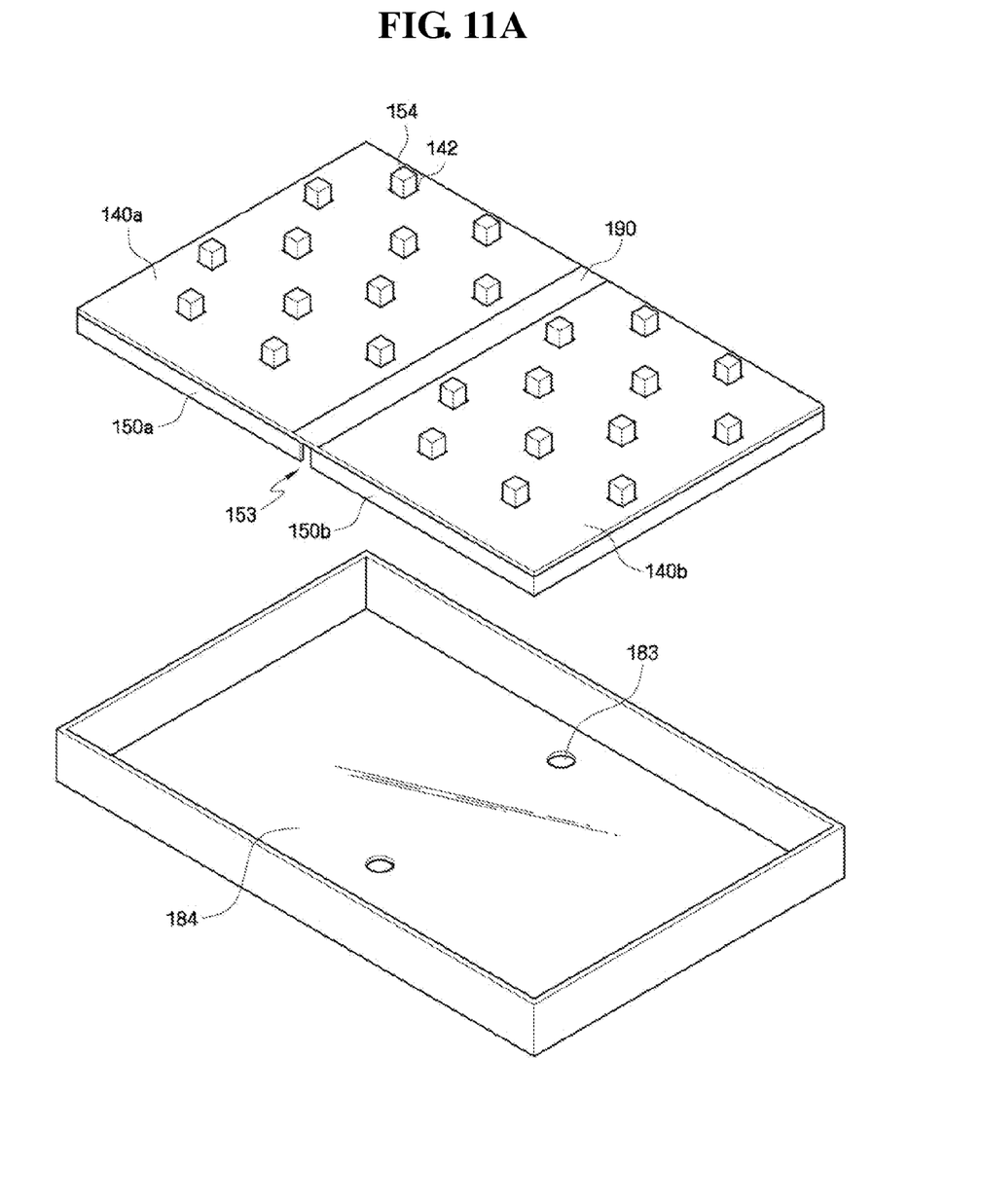
FIG. 11A is a perspective view showing a backlight assembly in accordance with another embodiment of the invention.
Figure 11B:
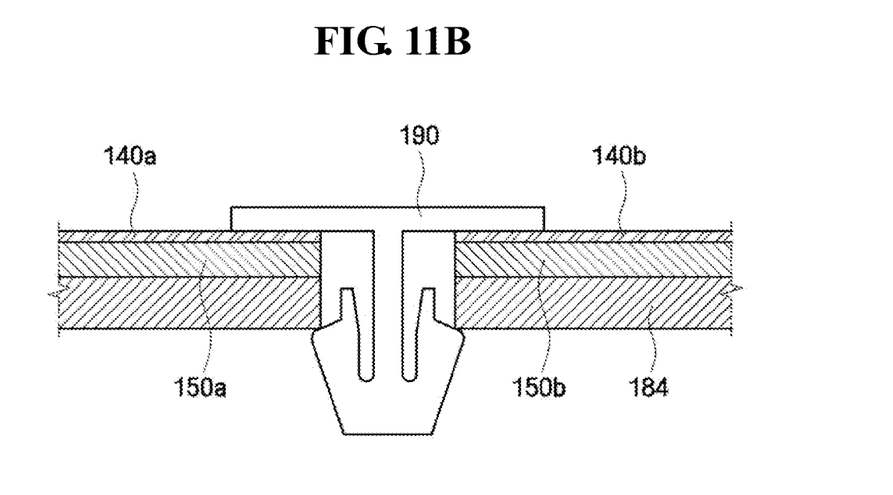
FIGS. 11B and 11C show details of the reflective cover in FIG. 11A.
Figure 11C:
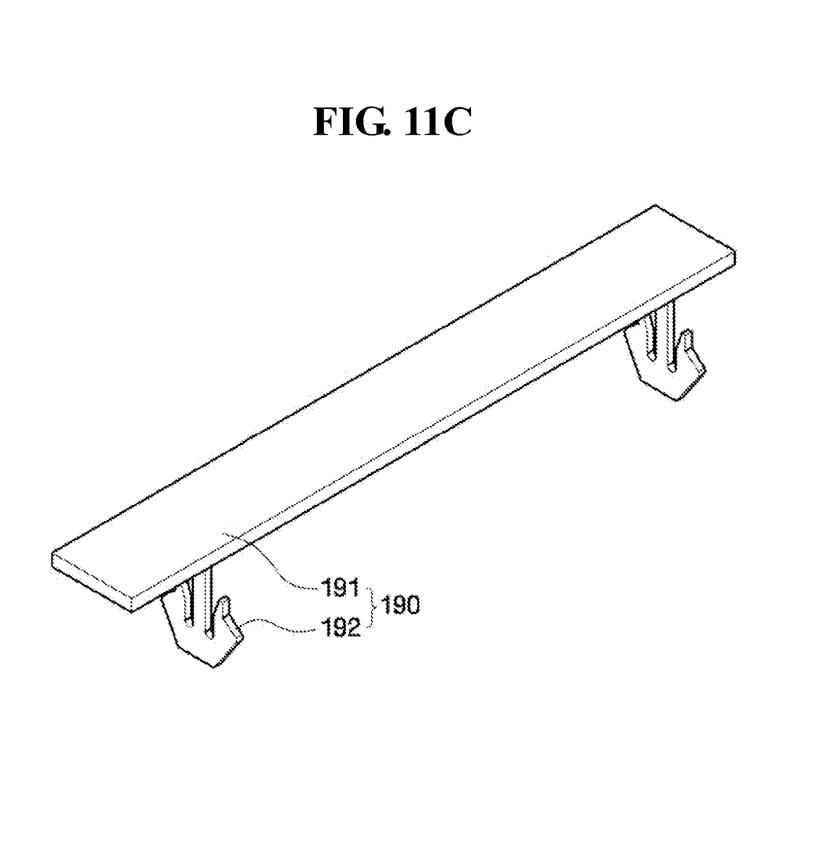

FIG. 11A is a perspective view showing a backlight assembly in accordance with another embodiment of the invention. Details of a reflective cover 190 in FIG. 11A are shown in FIGS. 11B and 11C. As shown, the reflective cover 190 includes a plate 191 and a plurality of coupling members 192 extending from the plate 191. The lower receiving container 160 includes coupling holes 183 through which the coupling members 192 extend.

The plate 191 is wide enough to cover the neighboring area 153. The coupling mechanism, which may be similar to the coupling mechanism 170 shown in FIG. 3, extends through the neighboring area 153 and the coupling holes 183 to fix the plate 190 to the receiving container (184). The reflective cover 190 covers the neighboring area 153 and fixes the reflective members 140*a*, 140*b* and the substrate units 150*a*, 150*b* to the receiving container 184. The reflective cover 190 may be made of polycarbonate. Although FIG. 11B shows the ends of the reflective members 140*a* and 140*b* as being flush with the ends of the substrate units 15*a* and 150*b*, respectively, for simplicity of illustration, the reflective cover 190 can be used for any other situation. The plate 191 may be made wide enough to cover any gap between the reflective member 140*a*, 140*b* and any gap between the substrate units 150*a*, 150*b*.

Although the foregoing invention has been described in some detail by way of illustration and examples for purposes of clarity and understanding, it will be apparent that modifications and alternative embodiments of the invention are contemplated which do not depart from the spirit and scope of the invention as defined by the foregoing teachings and appended claims.

What is claimed is:

1. A backlight assembly comprising:
a plurality of coplanar, side-by-side but spaced apart substrate units; and
a plurality of coplanar, side-by-side but spaced apart reflective members each respectively disposed to at least cover a corresponding upper area of one of the substrate units,
wherein a first gap is formed between a first and second of the side-by-side reflective members,
wherein a second gap is formed between the corresponding side-by-side substrate units of the first and second reflective members,
wherein the second gap is wider than the first gap,
wherein the first of the first and second reflective members is larger in area of extent than that of its corresponding substrate unit,
wherein there is an inter-substrate gap area where some of the spaced apart substrate units are closest to each other, and
wherein at least one of the reflective members covers the inter-substrate gap area.

2. The backlight assembly of claim 1, wherein the first reflective member protrudes beyond a corresponding first edge of its corresponding substrate unit, the first edge being disposed in spaced apart side-by-side relation to an adjacent second edge of the corresponding substrate unit of the second reflective member.

3. The backlight assembly of claim 1, wherein at least one of the substrate units has a respective light source mounted thereon and wherein the corresponding reflective member of the at least one substrate unit has a respective cutout formed therein for exposing the respective light source of the at least one substrate unit.

4. The backlight assembly of claim 1, wherein there is a one-to-one correspondence between the number of substrate units and number of reflective members.

5. The backlight assembly of claim 1, further comprising a receiving container receiving the substrate units and the reflective members,
wherein the reflective members each comprises a respective first coupling hole,
wherein the substrate units each comprises a respective second coupling hole,
wherein the receiving container comprises a corresponding number of respective third coupling holes,
wherein respective triplets of the first coupling holes, the second coupling holes, and the third coupling holes overlap with each other.

6. The backlight assembly of claim 5, wherein the receiving container further comprises respective protruding portions protruding from respective inner surfaces of respective ones of the third coupling holes.

7. The backlight assembly of claim 6, further comprising a coupling member coupling the receiving container, the substrate units, and the reflective members to one another,
wherein a portion of the coupling member is inserted into at least one triplet of overlapping first, second and third coupling holes.

* * * * *